United States Patent
Gibson et al.

(10) Patent No.: US 9,415,761 B2
(45) Date of Patent: Aug. 16, 2016

(54) METHODS AND SYSTEM FOR IMPROVING HYBRID VEHICLE GEAR SHIFTING

(71) Applicant: Ford Global Technologies, LLC, Dearborn, MI (US)

(72) Inventors: Alexander O'Connor Gibson, Ann Arbor, MI (US); John Edward Brevick, Livonia, MI (US); Seunghoon Lee, Northville, MI (US); Matthew John Shelton, Gorsse Ile, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/523,454

(22) Filed: Oct. 24, 2014

(65) Prior Publication Data
US 2016/0114780 A1 Apr. 28, 2016

(51) Int. Cl.
*B60W 10/02* (2006.01)
*B60W 10/08* (2006.01)
*F16H 61/14* (2006.01)

(52) U.S. Cl.
CPC ............ *B60W 10/02* (2013.01); *B60W 10/026* (2013.01); *B60W 10/08* (2013.01); *B60W 2510/0695* (2013.01); *B60W 2510/088* (2013.01); *B60W 2710/024* (2013.01); *F16H 61/14* (2013.01)

(58) Field of Classification Search
CPC ............... B60W 2510/0266; B60W 2510/088; B60W 2510/0695; B60W 2510/10; B60W 2710/024
See application file for complete search history.

(56) References Cited

U.S. PATENT DOCUMENTS

| | | | |
|---|---|---|---|
| 8,433,488 B2 * | 4/2013 | Runde | F16H 61/143 701/67 |
| 2003/0066730 A1 | 4/2003 | Zink et al. | |
| 2003/0075412 A1 | 4/2003 | Heiartz et al. | |
| 2003/0079953 A1 | 5/2003 | Carlson et al. | |
| 2007/0287589 A1 * | 12/2007 | Kadono | B60W 10/06 477/110 |
| 2008/0280726 A1 | 11/2008 | Holmes et al. | |
| 2011/0114435 A1 | 5/2011 | Noehl et al. | |
| 2014/0163788 A1 * | 6/2014 | Doering | B60W 20/10 701/22 |
| 2014/0378273 A1 * | 12/2014 | Gibson | B60W 20/00 477/5 |

OTHER PUBLICATIONS

Gibson, Alex et al., "Modeling and Analysis of Engine Torque Modulation for Shift Quality Improvement," SAE Technical Paper Series No. 2006-01-1073, 2006 SAE World Congress, Detroit, MI., Apr. 3-6, 2006, 14 pages.
O'Connor Gibson, Alexander et al., "Methods and Systems for Improving Hybrid Vehicle Transmission Shifting," U.S. Appl. No. 14/448,944, filed Jul. 31, 2014, 32 pages.

* cited by examiner

*Primary Examiner* — Ramya Burgess
*Assistant Examiner* — David Morris
(74) *Attorney, Agent, or Firm* — David Kelley; Alleman Hall McCoy Russell & Tuttle LLP

(57) ABSTRACT

Systems and methods for improving gear shifting of a step-ratio automatic transmission in a hybrid vehicle are presented. The systems and methods may provide for adjusting torque capacity of one or more driveline clutches to reduce driveline torque disturbances that may be related to driveline inertia torque during transmission gear shifting.

20 Claims, 7 Drawing Sheets

METHODS AND SYSTEM FOR IMPROVING HYBRID VEHICLE GEAR SHIFTING

FIELD

The present description relates to methods and a system for improving shifting of a hybrid vehicle. The methods may be particularly useful for hybrid vehicles that selectively directly couple an electric machine to an engine via a driveline disconnect clutch.

BACKGROUND AND SUMMARY

One hybrid vehicle configuration includes an engine that is directly coupled to a driveline disconnect clutch, and the disconnect clutch is directly coupled to a driveline integrated starter/generator (DISG), which is directly coupled to a torque converter impeller. The driveline may also include a dual mass flywheel that includes springs that operate with the flywheel's masses to provide mechanical dampening between the engine and the driveline disconnect clutch. The dual mass flywheel reduces amplitude of engine torque pulses that may be transferred to the vehicle's transmission and wheels. However, the flywheel's mass increases driveline inertia to decrease fuel economy. Additionally, the flywheel's inertia contributes to an increased inertia torque produced at an input shaft of a transmission. The increased inertia torque may increase driveline torque disturbances during transmission gear shifting because of an increased amount of torque being transmitted through transmission gear clutches increases. Therefore, it would be desirable provide the benefits of a dual mass flywheel while providing reduced inertia torque to a transmission input shaft during transmission gear shifting.

The inventors herein have recognized the above-mentioned disadvantages and have developed a method, comprising: proportionately adjusting a torque capacity of a torque converter clutch in response to an amplitude of an inertia torque produced via an inertia located upstream of the torque converter clutch, the inertia including inertia of a disconnect clutch and inertia of a motor, the disconnect clutch directly coupled to the motor.

By adjusting a torque capacity of a torque converter clutch, it may be possible to provide the technical result of reducing an inertia torque present at a transmission input shaft during gear shifting so that torque disturbances during transmission gear shifting may be reduced. Additionally, it may be possible to eliminate or reduce a mass of a dampening flywheel positioned between an engine and a driveline disconnect clutch, thereby improving vehicle fuel efficiency. For example, during transmission gear shifting, torque capacity of a torque converter clutch may be reduced such that the torque converter clutch slips and effectively reduces inertia present or observed at a transmission shaft located downstream of the torque converter clutch. Slipping the torque converter clutch may allow less inertia torque to be transferred from upstream of the torque converter clutch to a transmission input shaft located downstream of the torque converter clutch.

The present description may provide several advantages. Specifically, the approach may improve transmission gear shifting by smoothing transmission gear shifts. Further, the approach may improve vehicle fuel economy via reducing driveline inertia. In addition, the approach may reduce driveline cost by eliminating or reducing mass of a dampening flywheel. The described advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
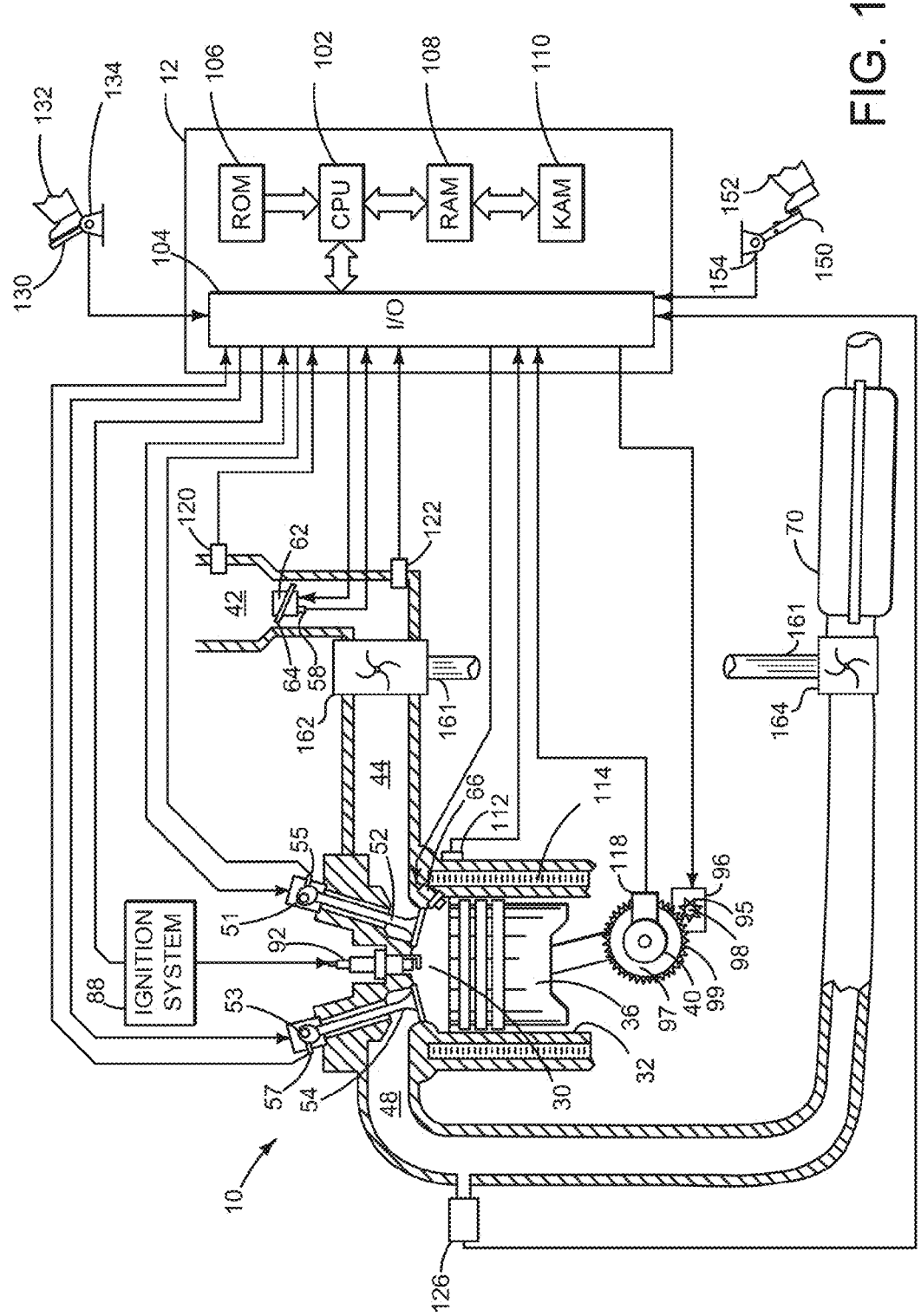
FIG. 1 is a schematic diagram of an engine.
Figure 2:
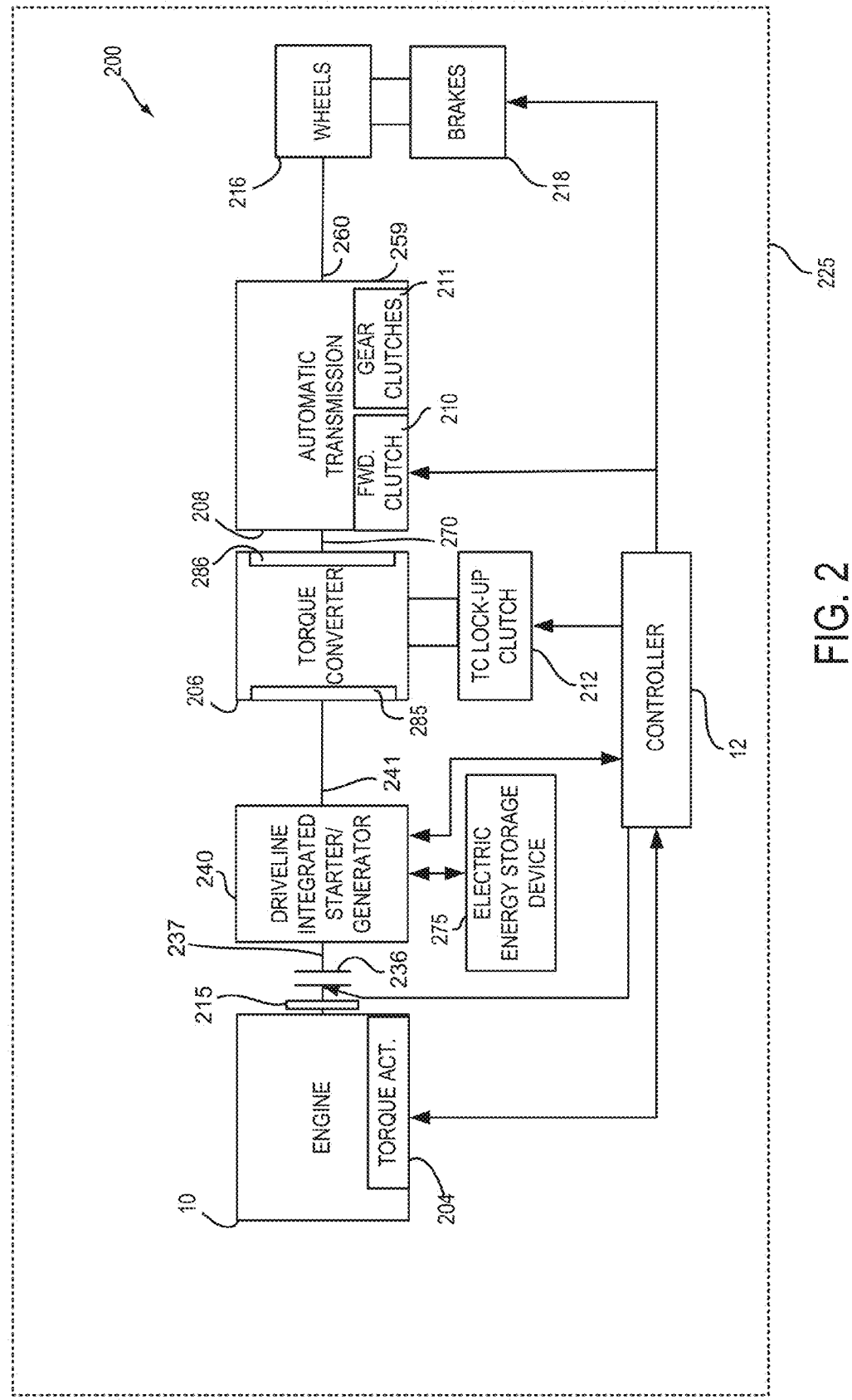
FIG. 2 shows an example vehicle driveline configuration.
Figure 3A:
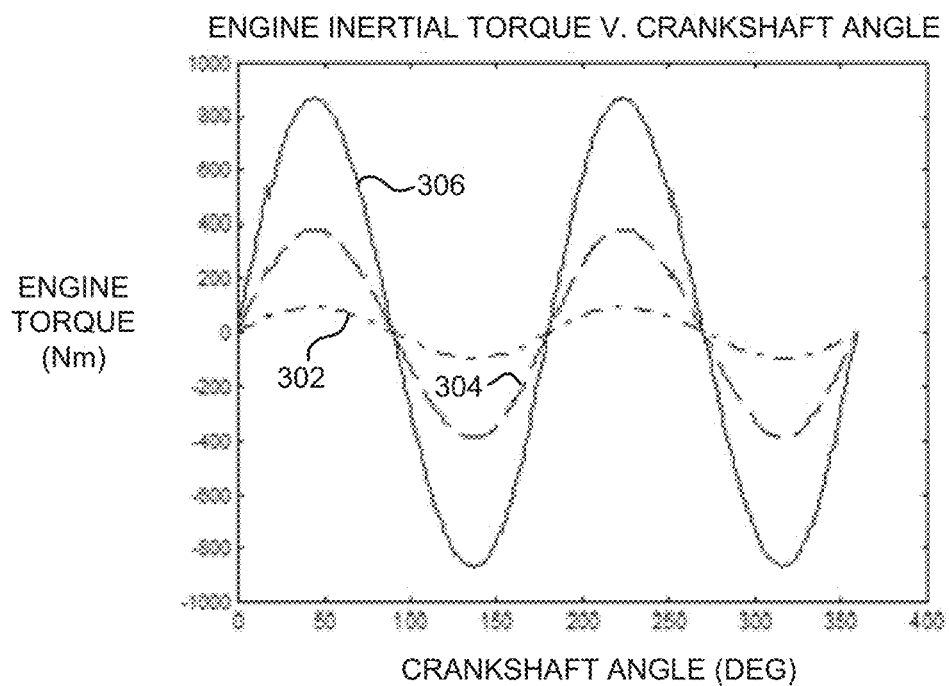
FIGS. 3A and 3B show example engine inertia torques.
Figure 3B:
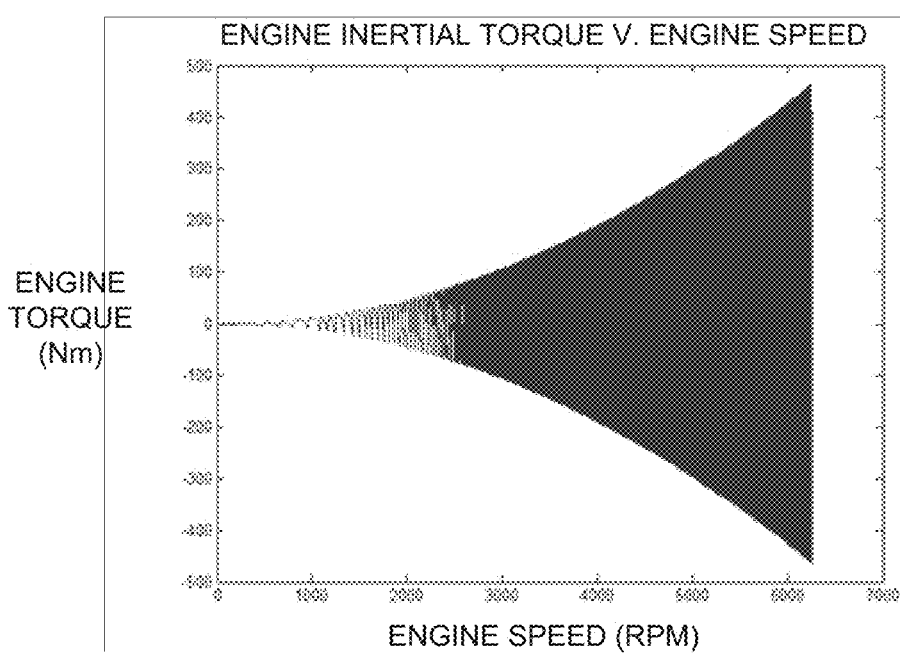

The present description is related to improving hybrid vehicle driveline operation. The hybrid vehicle may include an engine as is shown in FIG. 1. The engine may be included in a driveline as is shown in FIG. 2. The engine may exhibit inertia torque as is shown in FIGS. 3A and 3B. The hybrid vehicle driveline may operate as illustrated in the driveline operating sequence of FIG. 4. Further, the hybrid vehicle driveline may be operated according to the method of FIGS. 5A and 5B in the system of FIGS. 1 and 2 to provide the operating sequence shown in FIG. 4. Finally, crankshaft dynamic equations are based on crankshaft and connecting rod kinematics shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through optional dual mass flywheel 215. Thus, the engine is directly coupled to the driveline disconnect clutch 236 without intermediate gears or devices. The dual mass flywheel may include masses and springs that operate as a mechanical damper. Therefore, the duel mass flywheel may be described as a dampening flywheel as opposed to flywheels that to not include springs and that are not described as dampening flywheels. Flywheels that do not include springs may also be referred to as non-dampening flywheels even though the flywheel inertia may provide a small amount of dampening to the driveline. In some example driveline configurations, dual mass flywheel 215 may be absent or it may have a reduced mass made possible via driveline clutch torque capacity control. Disconnect clutch 236 may be electrically or hydraulically actuated. The downstream side of disconnect clutch 236 is shown mechanically coupled to DISG input shaft 237. Thus, the disconnect clutch 236 is directly coupled to the DISG 240 without intermediate gears or devices.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is directly mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Referring now to FIG. 3A, a plot of a four cylinder engine's inertial torque at different engine speeds is shown. The plot's Y axis represents the engine's inertial torque. The plot's X axis represents the engine's crankshaft angle.

Trace 302 represents the engine's inertial torque at an engine speed of 2000 revolutions per minute (RPM). Trace 304 represents the engine's inertial torque at an engine speed of 4000 RPM. Trace 306 represents the engine's inertial torque at a engine speed of 6000 RPM. Thus, it may be observed that the engine's inertial torque amplitude increases with increasing engine speed. The increase in engine torque is related to increased engine acceleration at higher engine speeds. The engine torque crosses at zero at the same crankshaft angle for each of the engine speeds since the engine's pumping cycle is invariant with engine crankshaft angle.

Referring now to FIG. 3B, a plot of a six cylinder engine's inertial torque versus the engine's speed is shown. The plot's Y axis represents the engine's inertial torque. The plot's X axis represents the engine's speed. Hence, it may be observed that the engine's inertia torque increases as engine speed increases and as cyclic piston acceleration increases. Further, the engine's inertial torque increase is not linear with engine speed. It may also be observed that the engine's inertial torque frequency increases as engine speed increases since the number of engine cycles per second increases as engine speed increases.

Figure 4:
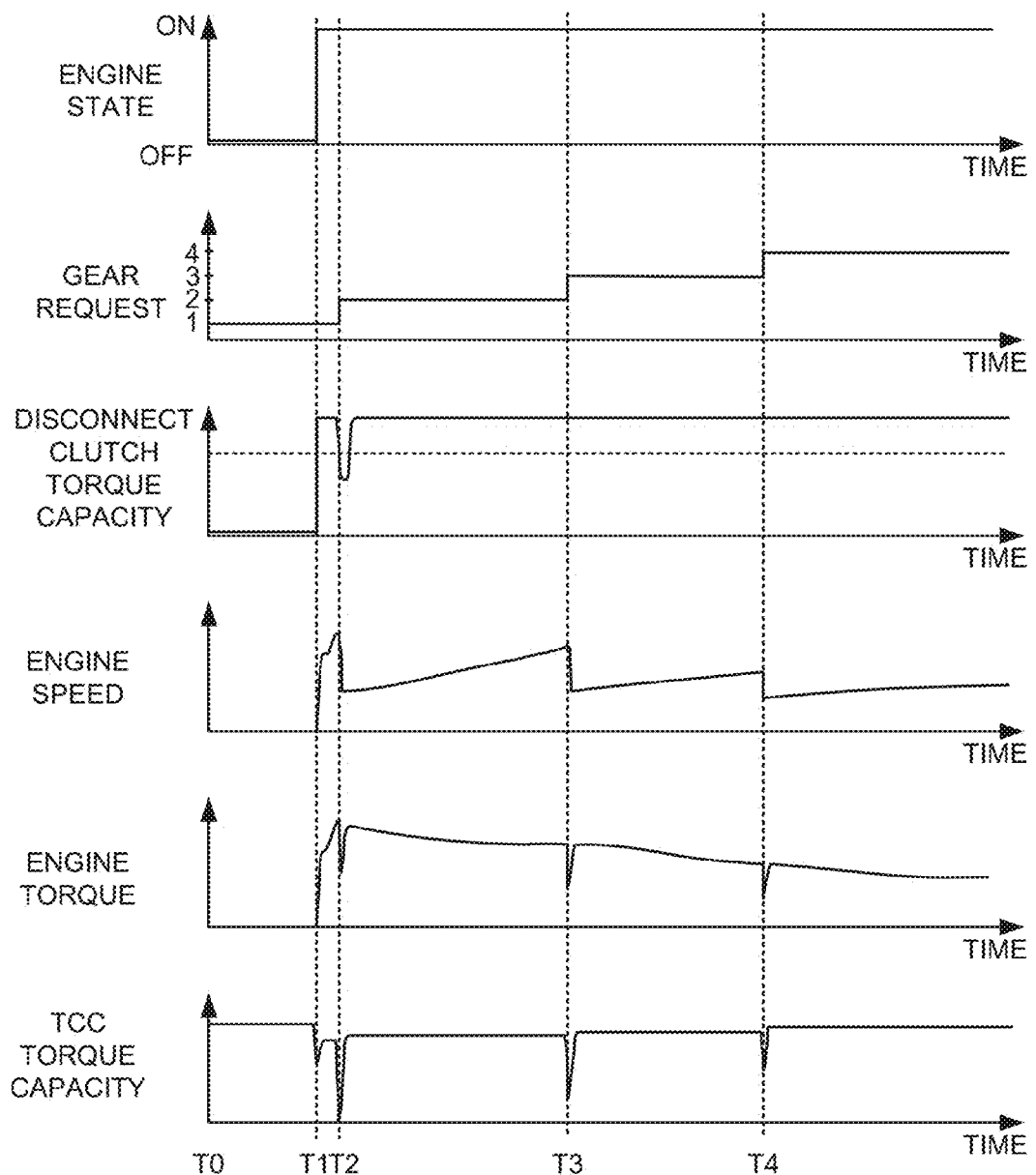
FIG. 4 shows an example hybrid vehicle operating sequence.

Referring now to FIG. 4, an example hybrid vehicle operating sequence is shown. The sequence of FIG. 3 may be provided by the system of FIGS. 1 and 2 executing the method of FIG. 4 stored as instructions in non-transitory memory. The vertical lines at T1-T4 represent particular time of interest during the sequence.

The first plot from the top of FIG. 4 is a plot of engine operating state versus time. The Y axis represents engine operating state and the engine is operating when the trace is at a higher level near the Y axis arrow. The engine is not operating or combusting when the trace is at a lower level near the X axis. The X axis represents time and time increases from the left to right side of the figure.

The second plot from the top of FIG. 4 is a plot of transmission gear request versus time. The Y axis represents transmission gear request and the requested transmission gear is indicated along the Y axis arrow. The X axis represents time and time increases from the left to right side of the figure.

The third plot from the top of FIG. 4 is a plot of driveline disconnect clutch torque capacity versus time. The Y axis represents disconnect clutch torque capacity and disconnect clutch torque capacity increases in the direction of the Y axis arrow. The X axis represents time and time increases from the left to right side of the figure. The disconnect clutch torque capacity may be increased by increasing a pressure or force applied to close the disconnect clutch. The disconnect clutch torque capacity may be decreased by decreasing pressure or force applied to the disconnect clutch. Horizontal line 402 represents a disconnect clutch torque capacity sufficient to hold the driveline disconnect clutch fully closed (e.g., no clutch slipping) when the engine is operated at maximum engine torque.

The fourth plot from the top of FIG. 4 is a plot of engine speed versus time. The Y axis represents engine speed and engine speed increases in the direction of the Y axis. The X axis represents time and time increases from the left to right side of the figure.

The fifth plot from the top of FIG. 4 is a plot of engine combustion torque versus time. The Y axis represents engine combustion torque and engine combustion torque increases in the direction of the Y axis arrow. The X axis represents time and time increases from the left to right side of the figure.

The sixth plot from the top of FIG. 4 is a plot of torque converter clutch (TCC) torque capacity versus time. The Y axis represents TCC torque capacity and TCC torque capacity increases in the direction of the Y axis arrow. The X axis represents time and time increases from the left to right side of the figure.

At time T0, the engine is not operating and the TCC torque capacity is at a higher level. The transmission is in first gear as indicated by the gear request trace. The driveline disconnect clutch torque capacity is zero since the driveline disconnect clutch is fully open. The engine speed and torque are at zero since the engine is not operating. The DISG (not shown) may provide torque to the hybrid vehicle driveline during such conditions to propel the vehicle.

At time T1, the engine state transitions from off to on to indicate the engine is being started. The engine may be started in response to a driver demand torque, vehicle speed, or other vehicle conditions. The disconnect clutch is closed to provide torque from the DISG (not shown) to start the engine. The engine speed increases as DISG torque accelerates the engine. Engine combustion torque also increases as the engine begins to combust air and fuel. The TCC torque capacity is reduced to reduce torque oscillations that may result from closing the disconnect clutch and starting the engine. The torque converter clutch may slip (e.g., difference between speed of an input side of the TCC and a speed of an output side of the TCC) when the TCC torque capacity is reduced.

At time T2, the transmission requested gear changes from first gear to second gear in response to vehicle speed and driver demand torque (not shown). The disconnect clutch torque capacity and the TCC torque capacity are reduced in response to the engine combustion torque and inertial torque upstream of the TCC. The inertial torque upstream of the TCC includes inertias of the engine, DISG, and disconnect clutch. The dual mass flywheel is not present in the driveline configuration of this example. The relatively high engine speed increases the engine's inertial torque (not shown in FIG. 4) as shown in FIGS. 3A and 3B. The engine combustion torque is also at a relatively high level. Therefore, to reduce torque at a transmission input shaft, engine torque is reduced via spark retard and inertial torque is reduced via reducing TCC torque capacity and disconnect clutch capacity to a capacity where both the TCC and disconnect clutch slip. In this example, the disconnect clutch capacity is adjusted to a higher torque capacity than the TCC torque capacity. By reducing the TCC and disconnect clutch torque capacity, inertial and combustion torque at the transmission input shaft may be reduced.

Between time T2 and time T3, the engine continues to operate and the transmission stays in second gear. Further, the disconnect clutch remains fully closed and engine speed increases in response to driver demand torque. The engine torque is reduced in response to a reduced driver demand torque (not shown). The TCC torque capacity is at a higher level, but some slip is allowed to dampen higher frequency torque pulses produced by combustion in engine cylinders. Thus, the TCC is allowed to slip when the transmission is not being shifted to reduce driveline torque pulsations from the engine.

At time T3, the requested transmission gear changes from second gear to third gear in response to vehicle speed and driver demand torque (not shown). The requested gear is changed at a lower engine speed than the engine speed when the requested gear changed at time T2. Further, the engine combustion torque is lower at time T3 than at time T2. Therefore, there is less inertial torque and combustion torque that may be applied to the transmission input shaft. Consequently, only the TCC torque capacity is reduced at time T3. The disconnect clutch remains fully closed, thereby eliminating disconnect clutch slip. Further, the TCC torque capacity is reduced to a higher value than the torque capacity value of the TCC at time T2. The TCC torque capacity is adjusted (e.g., reduced) in response to the inertial torque amplitude and frequency. The engine speed decreases in response to the transmission shifting from second gear to third gear.

Between time T3 and time T4, the engine torque continues to decrease as the driver demand torque (not shown) is reduced by a driver in response to the increasing vehicle speed (not shown). The engine speed increases, but at a lower rate than at times before T4. The TCC torque capacity is increased in response to the lower combustion torque so that the TCC slip is reduced. The TCC torque capacity may be increased because the combustion torque amplitude is reduced at lower engine torque levels.

At time T4, the requested transmission gear changes from third gear to fourth gear in response to vehicle speed and driver demand torque (not shown). The requested gear is changed at a lower engine speed than the engine speed when the requested gear changed at time T3. Additionally, the engine combustion torque is lower at time T4 than at time T3. Therefore, there is less inertial torque and combustion torque that may be applied to the transmission input shaft. As a result, the TCC torque capacity is reduced less at time T4 than at time T3. The disconnect clutch remains fully closed. The TCC torque capacity is adjusted (e.g., reduced) in response to the inertial torque amplitude and frequency. As such, the TCC torque capacity during the shift at time T4 is greater than the TCC torque capacity during the shift at time T3. The engine speed decreases in response to the transmission shifting from third gear to fourth gear.

In this way, TCC and driveline clutch torque capacity may be adjusted during gear shifting and while not during gear shifting based on engine combustion and inertial torque. In one example, if the engine combustion torque and inertial torque at the transmission would be greater than a desired torque if the TCC and/or disconnect clutch were fully closed, the TCC and/or disconnect clutch torque capacity may be reduced to reduce torque at the transmission input shaft.

Figure 5A:
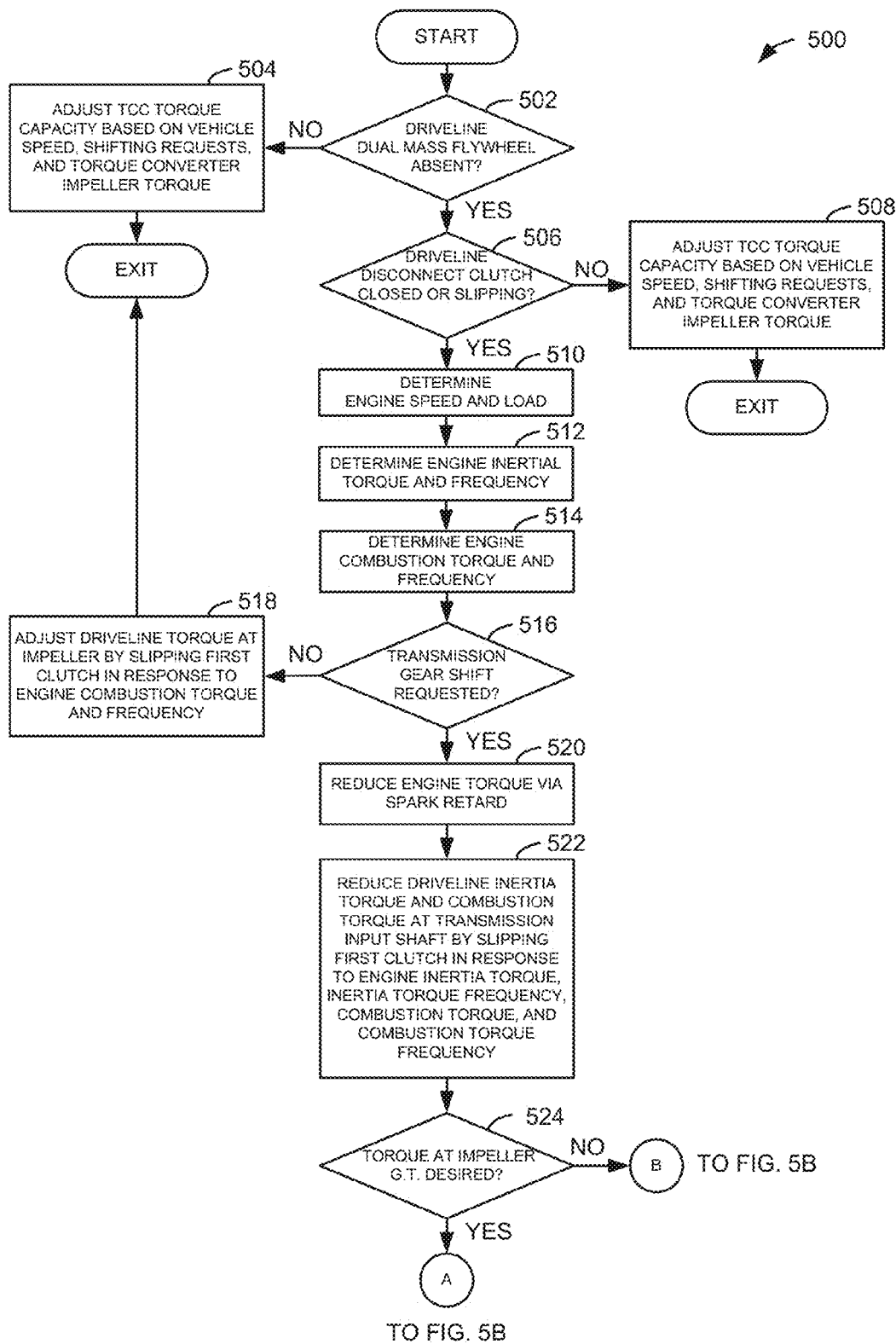
FIGS. 5A and 5B show an example method for operating a hybrid vehicle driveline.
Figure 5B:
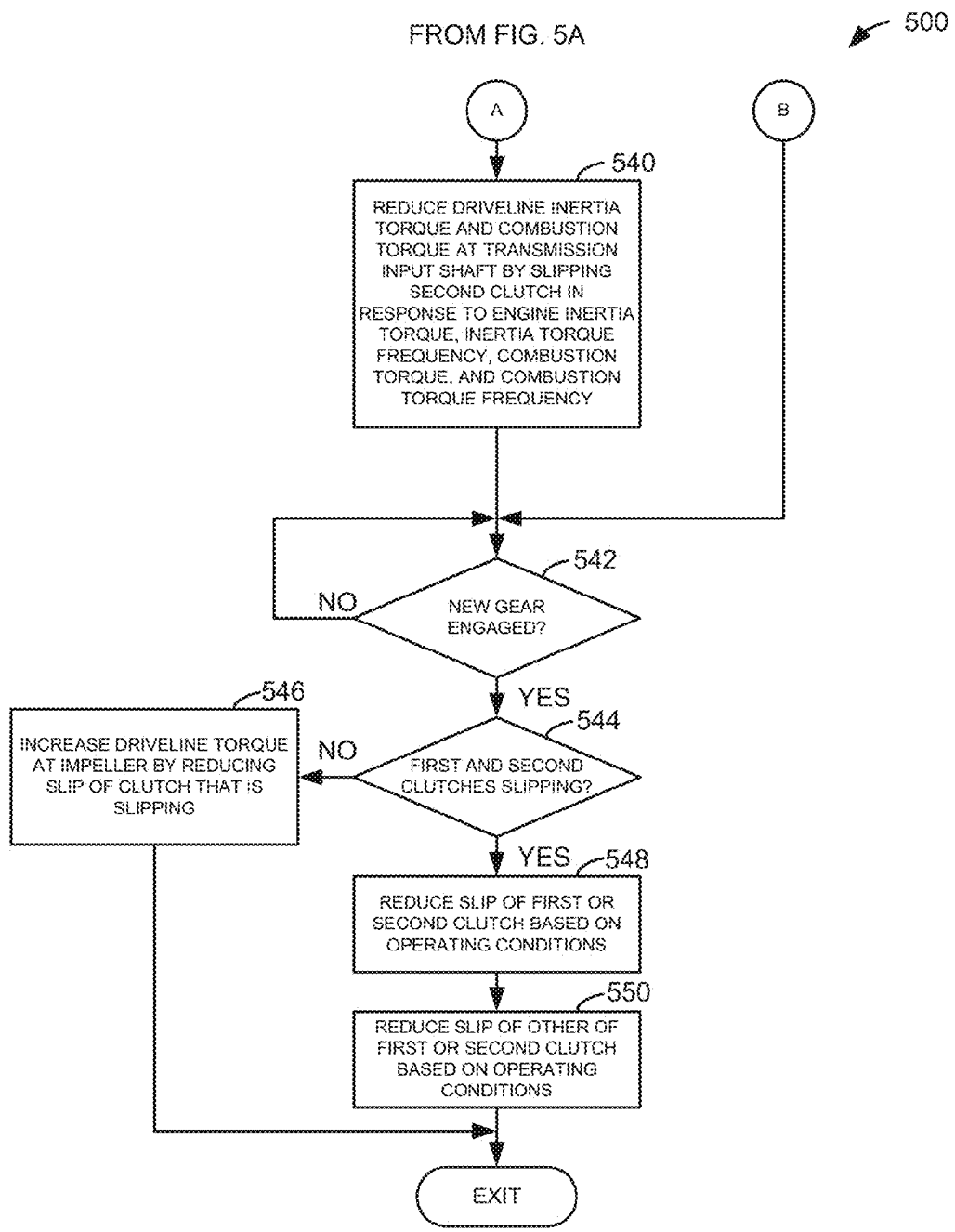

Referring now to FIGS. 5A and 5B, a method for operating a hybrid vehicle driveline is shown. The method of FIGS. 5A and 5B may be included in the system of FIGS. 1 and 2 as executable instructions stored in non-transitory memory. Additionally, the method of FIGS. 5A and 5B may provide the operating sequence shown in FIG. 4. The method of FIGS. 5A and 5B adjusts driveline clutches upstream of a transmission input shaft to control driveline torque disturbances. Equation 1 shows that transmission output torque is a function of inertia upstream of the transmission:

$$T_{OS} = T_{IS} - T_{FC2} - (I_r \dot{\omega}_r + (I_c + I_{us})\dot{\omega}_c + I_s \dot{\omega}_s) \quad \text{(Equation 1)}$$

where $T_{OS}$ is transmission output shaft torque, $T_{IS}$ is transmission input shaft torque; $T_{FC2}$ is torque transferred by an on-coming clutch; $I_r$ is transmission ring gear inertia; $\dot{\omega}$ is transmission ring gear angular acceleration; $I_c$ is transmission effective carrier inertia; $I_{us}$ is upstream inertia or inertia upstream of a transmission input shaft which may include one or more of the engine, DISG, disconnect clutch, and driveline disconnect clutch; $\dot{\omega}_c$ is transmission carrier angular acceleration; $I_s$ is transmission sun gear inertia; and $\dot{\omega}_s$ is transmission sun gear angular acceleration. Thus, to reduce torque disturbances during a step ratio transmission gear shift, it may be desirable to reduce inertia upstream of the transmission input shaft.

At 502, method 500 judges if the hybrid driveline is absent a dual mass flywheel or another type of mechanical dampening device that includes springs and masses. Alternatively or in addition, method 500 may judge if the hybrid driveline includes a dual mass flywheel of relatively low inertia. If method 500 judges that one or both conditions are present, the answer is yes and method 500 proceeds to 506. Otherwise, the answer is no and method 500 proceed to 504.

At 504, method 500 adjusts the torque converter clutch (TCC) capacity based on vehicle speed, transmission gear shift requests, and torque converter impeller torque or driver demand torque. For example, if vehicle speed is increasing and a gear change request from $2^{nd}$ gear to $3^{rd}$ gear is made, the TCC torque capacity may be reduced during the gear shift. In addition, the TCC torque capacity may be reduced in response to a driver releasing an accelerator pedal or increasing driver demand torque to a value greater than a threshold value. In some examples, TCC application force or torque capacity is mapped based on operating conditions such as driver demand torque, vehicle speed, and gear shifting requests. In this way, the TCC may be operated to smooth driveline torque disturbances in response to driving conditions when a mechanical dampening flywheel is included in the driveline. Method 500 proceeds to exit after TCC operation is scheduled.

At 506, method 500 adjusts the torque converter clutch (TCC) based on vehicle speed, transmission gear shift requests, and torque converter impeller torque or driver demand torque. However, the TCC torque capacity at 506 may be adjusted to different capacities than those at 504 since the dual mass flywheel is not present or has reduced mass. For example, if vehicle speed is increasing and a gear change request from $2^{nd}$ gear to $3^{rd}$ gear is made, the TCC torque capacity may be reduced more significantly at 506 than at 504 during the gear shift. In addition, the TCC torque capacity may be reduced in response to a driver releasing an accelerator pedal or increasing driver demand torque to a value greater than a threshold value more significantly at 506 than at 504. Consequently, the TCC may be operated to smooth driveline torque disturbances in response to driving conditions when a mechanical dampening flywheel is not included in the driveline. Method 500 proceeds to exit after TCC operation is scheduled.

At 510, method 500 determines engine speed and load. Engine speed may be determined via an engine position sensor and engine load may be determined based on an air mass flowing through the engine or driver demand torque as interpreted from a position of an accelerator pedal. Method 500 proceeds to 512 after engine speed and load are determined.

At 512, method 500 determines an engine's inertial torque and frequency. The engine's inertial torque frequency may be determined by dividing engine RPM by sixty and multiplying the result by the number of cylinder cycles per engine revolution (e.g., two cylinder cycles for each revolution of a four cylinder four stroke engine).

Figure 6:
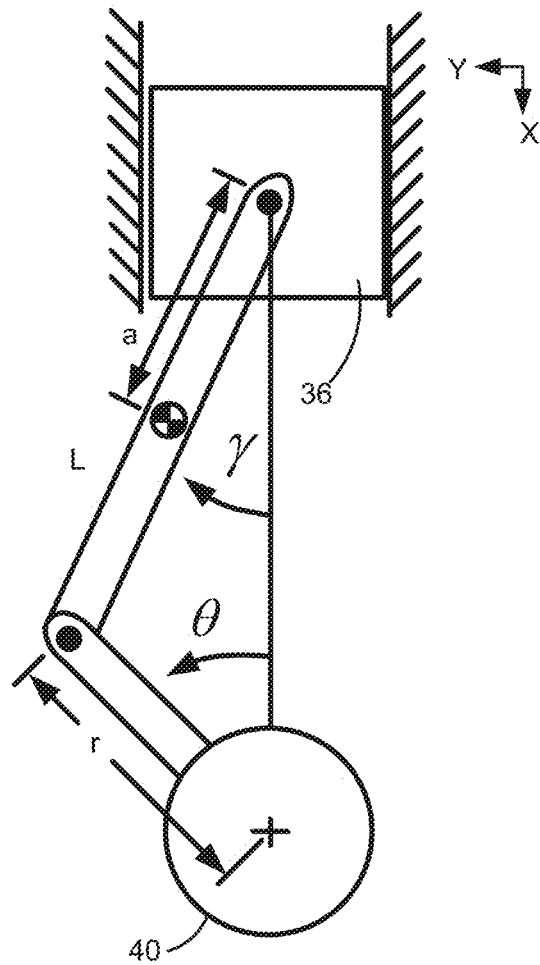
FIG. 6 shows engine crankshaft and connecting rod kinematics for determining crankshaft dynamic equations.

Engine crankshaft dynamics may be described based on the connecting rod and crankshaft kinematic descriptors shown in FIG. 6 and according to the following equation:

$$\left\{(I_{CSh} + I_{FW} + I_{FEAD}) + \sum_{i=1}^{n_{cyl}} m_p L_{eff}^2\right\}\ddot{\theta} = \qquad \text{(Equation 2)}$$

$$T_{comb} - T_I + T_{Dr} + \sum T_{FEAD}$$

where $I_{CSh}$ is crankshaft inertia, $I_{FW}$ is engine flywheel inertia, $I_{FEAD}$ is front end accessory drive inertia (e.g., balancer inertia plus air conditioning compressor inertia), $m_p$ is mass of an engine piston, $L_{eff}$ is effective connecting rod length, $\ddot{\theta}$ is angle theta acceleration, $T_{comb}$ is engine combustion torque, $T_I$ is engine inertia torque, and $T_{FEAD}$ is front end accessory drive torque.

The effective connecting rod length may be described by the following equation:

$$L_{eff} = \left(r\sin\theta_i + \frac{r\left(\frac{r}{L}\right)\sin\theta_i\cos\theta_i}{\sqrt{1 - \left(\frac{r}{L}\sin\theta_i\right)^2}}\right) \qquad \text{(Equation 3)}$$

where r is a radius from the center of the crankshaft to the crankshaft connecting rod pin, $\theta_i$ is the angle $\theta$ shown in FIG. 6 for the $i^{th}$ cylinder, and L is the connecting rod length. From $L_{eff}$ the engine inertia torque may be determined as:

$$T_I = \left\{\sum_{i=1}^{n_{cyl}} m_p L_{eff}\left(r\cos\theta_i + \frac{r\left(\frac{r}{L}\right)\cos 2\theta_i}{\sqrt{1 - \left(\frac{r}{L}\sin\theta_i\right)^2}} + \frac{r\left(\frac{r}{L}\right)\left(\frac{r}{L}\right)^2\sin^2\theta_i\cos^2\theta_i}{\left(1 - \left(\frac{r}{L}\sin\theta_i\right)^2\right)^{3/2}}\right)\right\}\dot{\theta}^2 \qquad \text{(Equation 4)}$$

Thus, the engine's inertia torque is based on a position of each piston in each cylinder as the engine rotates. Method 500 proceeds to 512 after the engine's inertial torque is determined.

At 514, method 500 determines the engine combustion torque and frequency. The engine combustion frequency may be determined by dividing engine RPM by sixty and multiplying the result by the number of cylinder combusting an air-fuel mixture each engine cycle per engine revolution (e.g., one cylinder for each revolution of a four cylinder four stroke engine with two deactivated cylinders). The engine combustion torque may be determined via the following equation:

$$T_{comb} = \sum_{i=1}^{n_{cyl}} p_i A_p L_{eff} \qquad \text{(Equation 5)}$$

where $p_i$ is pressure in the $i^{th}$ cylinder and $A_p$ is area of the top of the piston. Pressure in the cylinder may be empirically determined based on engine speed, engine load, spark timing, and air-fuel ratio and stored in memory for subsequent retrieval. Thus, the engine combustion torque is a sum of combustion torques of each engine cylinder. Method 500 proceeds to 516 after engine combustion torque and frequency are determined.

At 516, method 500 judges if a stepped ratio transmission gear shift is being requested. In one example, a gear shift may be requested in response to vehicle speed and driver demand torque. If method 500 judges that a gear shift is being requested or in progress, the answer is yes and method 500 proceeds to 520. Otherwise, the answer is no and method 500 proceeds to 518.

At 518, method 500 adjusts torque capacity of a first clutch in response to engine combustion torque and frequency. In one example, the first clutch may be a TCC. In another example, the first clutch may be a driveline disconnect clutch. By adjusting torque capacity of the first clutch, it may be possible to filter torque transferred by the engine to the transmission input shaft and reduce engine inertial torque at a transmission input shaft. In particular, the torque capacity may be reduced to where slip is generated between an input side of the first clutch and an output side of the first clutch. Engine torque transmitted through the first clutch may be reduced when the first clutch is slipping.

In one example, empirically determined amounts of slip for the first clutch are determined and stored to a table or function in memory. The table or function may be indexed by engine speed and load, and the table or function outputs a desired slip amount, or alternatively, a first clutch torque capacity that provides a desired amount of slip between the first clutch's input and output sides. Further, additional slip may be provided in response to the combustion frequency. For example, at lower combustion frequencies, the first clutch torque capacity may be adjusted to provide more slip than is provided when the engine is operated at the same speed and load at higher combustion frequencies. Thus, if the engine is rotating at 2500 RPM at 0.5 load with two cylinders deactivated, method 500 may slip the first clutch 100 RPM. However, if the same engine is rotating at 2500 RPM at 0.5 low with no deactivated cylinders, method 500 may slip the first clutch 50 RPM.

Additionally, if method 500 judges that the first clutch is operating above a threshold temperature, method 500 may increase coolant flow to the first clutch. In another example, if method 500 judges that the first clutch is operating above the threshold temperature, method 500 may stop slipping the first clutch and begin to slip a second clutch (e.g., the other of the disconnect clutch and the TCC). The second clutch may be slipped based on engine combustion torque and frequency in a way similar to the way the first clutch is slipped.

In this way, the torque capacity of the first clutch may be decreased to a torque capacity less than engine combustion torque in response to increasing engine combustion torque during conditions where the engine combustion torque may cause the driveline to oscillate if the first clutch is not slipped. Further, the torque capacity of the first clutch may be reduced to a torque capacity less than engine combustion torque during conditions where the combustion frequency is low enough to be noticeable to a driver. Thus, the first clutch torque capacity may be reduced in response to combustion torque frequency being less than a threshold frequency (e.g., 20 Hz).

At 520, method 400 reduces engine combustion torque by retarding spark timing from minimum spark timing for best torque (MBT). In one example, spark timing is retarded to provide a desired engine torque, but the amount of retard is combustion stability limited. For example, if a desired combustion torque at a torque converter impeller is 10 Nm and twenty degrees of spark retard from MBT is needed for the engine torque to be reduced to 10 Nm but combustion stability is less than desired at fifteen degrees spark retard from MBT, spark retard of more than fifteen degrees is not permitted. Spark retard for an engine torque or a reduction in engine torque may be stored in memory and retrieved based on a desired engine torque reduction amount during a transmission gear shift. The desired spark timing or retard from MBT timing may be retrieved from memory and output during gear shifting. Method 500 proceeds to 522 after engine spark timing is adjusted.

At 522, method 500 reduces the effective inertia torque and engine combustion torque upstream of a transmission input shaft by reducing torque capacity of a first clutch, thereby allowing the first clutch to slip and present a lower combined inertia torque and combustion torque to the transmission input shaft. The first clutch may be the TCC or the driveline disconnect clutch. The torque capacity of the first clutch is reduced to provide a desired engine inertia torque and combustion torque at the transmission input shaft that may be based on one or more of the following conditions including transmission gear being engaged, vehicle speed, present engine inertia torque amount, present inertia torque frequency, present combustion torque amount, present combustion torque frequency, and/or other conditions. For example, if based on a present vehicle speed, gear being engaged, engine inertia torque, engine inertia torque frequency, engine combustion torque, and engine combustion torque frequency, the desired torque at the transmission input shaft is 20 Nm during a shift, the torque capacity of the first clutch may be adjusted to 20 Nm or a nearest achievable torque capacity. The first clutch torque capacity may be adjusted proportionately with the engine inertia torque amount, inertia torque frequency, present combustion torque amplitude, and present combustion torque frequency.

In one example where the TCC is the first clutch, the TCC torque capacity may be adjusted to be less than the second clutch torque capacity. For example, dynamics at the DISG may be expressed as:

$$I_r \dot{\omega}_r = T_{DC} + T_{ISG} - (T_{BPC} - T_{IMP}) \qquad \text{(Equation 6)}$$

where $I_r$ is inertia of the DISG rotor, $\dot{\omega}_r$ is the angular acceleration of the DISG rotor, $T_{DC}$ is the torque transmitted by the driveline disconnect clutch, $T_{ISG}$ is DISG torque, $T_{BPC}$ is torque transmitted by the torque converter bypass clutch or TCC, and $T_{IMP}$ is the torque at the torque converter impeller which may be expressed as a function of torque converter impeller speed and torque converter turbine speed. The relationships between the TCC clutch torque capacity and the disconnect clutch torque capacity may be expressed as:

$$\text{Capacity}_{TDC} > \text{Capacity}_{TBPC} + I_r \dot{\omega}_r - T_{ISG} + T_{IMP}$$

where $\text{Capacity}_{TDC}$ is the torque converter disconnect clutch torque capacity, $\text{Capacity}_{TBPC}$ is the TCC or torque converter bypass clutch torque capacity. In this way, the TCC clutch capacity may be adjusted so that the TCC will slip before and transmit less torque than the driveline disconnect clutch when such operation is desired.

In other examples, the first clutch torque capacity may be reduced to a desired torque capacity in response to the transmission gear being engaged and vehicle speed. However, the transmission output torque may transmit some engine combustion frequencies to the vehicle wheels when torque capacity of the first clutch is adjusted responsive to fewer operating conditions.

The first clutch is commanded to the desired torque capacity at the transmission input shaft or a nearest achievable torque capacity where the torque capacity is repeatable and accurate to within a threshold torque of the desired torque capacity. The first clutch's torque capacity may be adjusted to the nearest achievable torque capacity for desired clutch capacities that may not be repeatable or stable. Method 500 proceeds to 524 after the first clutch is adjusted to a torque capacity that matches the desired torque at the transmission input shaft during the gear shift.

In some examples, the torque capacity of the first or second clutch may be adjusted in response to speed of a DISG exceeding a threshold speed. For example, if DISG speed is greater than a speed below which the DISG provides a constant maximum torque, the torque capacity of the first or second clutch may be reduced in response to engine combustion torque, combustion torque frequency, engine inertia torque, and engine inertia torque frequency transferred to the transmission input shaft. In one example, the DISG may be in a regenerative mode during transmission gear shifting to reduce engine combustion torque observed at the transmission input shaft. If engine combustion torque exceeds the DISG maximum torque, the first or second clutch torque capacity may be reduced.

At 524, method 500 judges whether or not torque at the transmission shaft may be reduced to the desired transmission input shaft torque during the gear shift via adjusting the first clutch. During some conditions, it may not be possible to provide the desired transmission input shaft torque via adjusting the torque capacity of the first clutch. Therefore, the torque capacity of the second clutch may be adjusted. The second clutch may be the other of the TCC or the driveline disconnect clutch. For example, if the first clutch is the driveline disconnect clutch, the inertia of the DISG and components between the transmission input shaft and the disconnect clutch may be such that the inertia torque present at the transmission input shaft is greater than the desired transmission input shaft torque. During such conditions, the TCC torque capacity may be reduced to allow the TCC to slip, thereby reducing the inertia torque presented to the transmission input shaft. On the other hand, if the first clutch is the TCC, the TCC may be fully opened and the torque converter may transfer more combustion torque and inertia torque to the transmission input shaft than the desired transmission input shaft torque. During such conditions, the driveline disconnect clutch torque capacity may be reduced to reduce engine combustion torque and inertia presented to the transmission input shaft. If method 500 judges that adjusting the first clutch torque capacity alone is insufficient to provide the desired transmission input shaft torque or that the torque at the transmission input shaft is or would be greater than the desired transmission input shaft torque, the answer is yes and method 500 proceeds to 540. Otherwise, the answer is no and method 500 proceeds to 544.

At 540, method 500 reduces the effective inertia torque and engine combustion torque upstream of a transmission input shaft by reducing torque capacity of a second clutch, thereby allowing the second clutch to slip and present a lower combined inertia torque and combustion torque to the transmission input shaft. Thus, torque capacity of the second clutch may be reduced in response to a torque capacity reduction of the first clutch being insufficient to reduce the sum of inertia torque and engine combustion torque to a threshold torque. The second clutch may be the other of the TCC or the driveline disconnect clutch that is not the first clutch. The torque capacity of the second clutch is reduced to provide a desired engine inertia torque and combustion torque at the transmission input shaft that may be based on one or more of the following conditions including transmission gear being engaged, vehicle speed, present engine inertia torque amount, present inertia torque frequency, present combustion torque amount, present combustion torque frequency, and/or other conditions. For example, if based on a present vehicle speed, gear being engaged, engine inertia torque, engine inertia torque frequency, engine combustion torque, and engine combustion torque frequency, the desired torque at the transmission input shaft is 20 Nm during a shift and adjusting the torque capacity of the first clutch only reduces transmission input shaft torque to 30 Nm, the torque capacity of the second clutch may be adjusted to 20 Nm while the transmission input shaft torque would be high than desired if only the torque capacity of the first clutch were adjusted. The second clutch torque capacity may be adjusted proportionately with the engine inertia torque amount, inertia torque frequency, present combustion torque amplitude, and present combustion torque frequency. Method 500 proceeds to 542 after the second clutch is adjusted to a torque capacity that matches the desired torque at the transmission input shaft during the gear shift.

At 542, method 500 judges whether or not the new gear is engage. For example, if the transmission is upshifting from $2^{nd}$ gear to $3^{rd}$ gear, the new gear is $3^{rd}$ gear. Method 500 may judge that the new gear is engaged when oil pressure supplied to the new gear's clutch is greater than a threshold pressure. Alternatively, method 500 may judge that the new gear is engaged when the transmission input speed is equal to the transmission output speed multiplied by the new gear ratio. If method 500 judges that the new gear is engaged, the answer is yes and method 500 proceeds to 544. Otherwise, the answer is no and method 400 returns to 542.

At 544, method 500 judges if both the first and second clutches are slipping. In one example, the first and second clutches may be determined to be slipping based on a speed difference between clutch inputs and clutch outputs. If method 500 judges that the first and second clutches are slipping, the answer is yes and method 500 proceeds to 548. Otherwise, the answer is no and method 500 proceeds to 546.

At 546, method 500 reduces slip of the clutch that is slipping by increasing the torque capacity of the clutch. For example, if the first clutch is the TCC, the torque capacity of the TCC is increased, although some slip may be retained to dampen engine torque pulsations. Likewise, if the first clutch is the driveline disconnect clutch, the torque capacity of the disconnect clutch is increased. Method 500 proceeds to exit after reducing slip of the first clutch.

At 550, method 500 reduces slip of the first or second clutch based on vehicle operating conditions. In one example, torque capacity of a clutch closest to its threshold operating temperature is increased first to reduce the clutch's temperature. In another example, torque capacity of the clutch that increases driveline efficiency more substantially is increased first. In still other conditions, torque capacity of one of the first and second clutch may always be increased before increasing torque capacity of the other of the first and second clutch. Method 500 proceeds to 552 after increasing torque capacity of the first or second clutch.

At 552, method 500 reduces slip of the other of the first and second clutch based on vehicle conditions. For example, if clutch torque capacity of the TCC is increased at 550, torque capacity of the disconnect clutch is increased at 552. In one example, torque capacity of the other clutch may be increased after clutch torque capacity is increased at 550 or after other conditions. In one example, torque capacity of the other clutch is increased at 552 in response to a predetermined amount of time after clutch torque capacity is increased at 550. Method 500 proceeds to exit after the torque capacity of the other clutch is increased at 550.

Thus, the method of FIGS. 5A and 5B provides for a method, comprising: proportionately adjusting a torque capacity of a torque converter clutch in response to an amplitude of an inertia torque produced via an inertia located upstream of the torque converter clutch, the inertia including inertia of a disconnect clutch and inertia of a motor, the disconnect clutch directly coupled to the motor. The method includes where the inertia does not include a dampening flywheel inertia. The method further comprises adjusting the torque capacity of the torque converter clutch in response to a frequency of the inertia torque. The method further comprises adjusting the torque capacity of the torque converter in response to an engine combustion torque. The method further comprises adjusting a torque capacity of a disconnect clutch to a greater torque capacity than the torque capacity of the torque converter clutch. The method includes where the inertia includes an engine inertia. The method further comprises reducing a torque capacity of a disconnect clutch in response to the inertia torque.

The method of FIGS. 5A and 5B also provides for a method, comprising: in response to a gear shift request and only when a disconnect clutch is fully closed or slipping, adjusting a torque capacity of a torque converter clutch to a torque capacity less than a torque capacity of the disconnect clutch, the torque capacity of the torque converter clutch further adjusted in response to an inertia torque produced via an inertia located upstream of the torque converter clutch and an engine combustion torque. The method includes where the inertia includes inertia of a disconnect clutch and inertia of a motor, and where the disconnect clutch is directly coupled to the motor. The method includes where the inertia further includes inertia of an engine, and where the engine is directly coupled to the disconnect clutch.

In some examples, the method includes where the torque capacity of the torque converter clutch is adjusted proportionately with amplitude of the inertia torque. The method includes where the torque capacity of the torque converter clutch is adjusted based on a frequency of the inertia torque. The method further comprises adjusting a torque capacity of disconnect clutch in response to the inertia torque. The method includes where the torque capacity of the disconnect clutch is reduced in response to reducing torque capacity of the torque converter clutch being insufficient to reduce the sum of inertia torque and engine combustion torque to a threshold torque.

The method of FIGS. 5A and 5B also provides for a method, comprising: adjusting a torque capacity of a first clutch located upstream of a transmission input shaft in response to an inertia torque produced via an inertia located upstream of the first clutch, the inertia including inertia of a disconnect clutch and inertia of a motor, the disconnect clutch directly coupled to the motor; adjusting a torque capacity of a second clutch located upstream of the transmission input shaft in response to an operating condition of the first clutch or a sum of inertia torque an engine combustion torque exceeding a threshold torque at an input shaft of a transmission. The method includes where the operating condition of the first clutch is a temperature of the first clutch exceeding a threshold temperature.

In some examples, the method further comprises increasing coolant flow to the first clutch in response to the first clutch exceeding the threshold temperature. The method includes where the inertia located upstream of the first clutch does not include inertia of a dampening flywheel. The method further comprises adjusting the torque capacity of the first clutch in response to an engine combustion torque during a transmission gear shift. The method further comprises adjusting the torque capacity of the first or second clutch in response to speed of a driveline integrated/starter generator exceeding a threshold speed.

As will be appreciated by one of ordinary skill in the art, the methods described in FIGS. 5A and 5B may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
proportionately adjusting a torque capacity of a torque converter clutch in response to an amplitude of a torque determined via an inertia of one or more devices located upstream of the torque converter clutch, the inertia including inertia of a disconnect clutch and inertia of a motor, the disconnect clutch directly coupled to the motor.

2. The method of claim 1, where the inertia does not include a dampening flywheel inertia.

3. The method of claim 1, further comprising adjusting the torque capacity of the torque converter clutch in response to a frequency of the torque.

4. The method of claim 1, further comprising adjusting the torque capacity of the torque converter clutch in response to an engine combustion torque.

5. The method of claim 1, further comprising adjusting a torque capacity of the disconnect clutch to a greater torque capacity than the torque capacity of the torque converter clutch.

6. The method of claim 1, where the inertia includes an engine inertia.

7. The method of claim 1, further comprising reducing a torque capacity of the disconnect clutch in response to the torque.

8. A method, comprising:
in response to a gear shift request and only when a disconnect clutch is fully closed or slipping, adjusting a torque capacity of a torque converter clutch to a torque capacity less than a torque capacity of the disconnect clutch, the torque capacity of the torque converter clutch further adjusted in response to a combustion torque of an engine and a torque determined via an inertia of one or more devices located upstream of the torque converter clutch.

9. The method of claim 8, where the inertia includes inertia of the disconnect clutch and inertia of a motor, and where the disconnect clutch is directly coupled to the motor.

10. The method of claim 9, where the inertia further includes inertia of the engine, and where the engine is directly coupled to the disconnect clutch.

11. The method of claim 8, where the torque capacity of the torque converter clutch is adjusted proportionately with an amplitude of the torque.

12. The method of claim 8, where the torque capacity of the torque converter clutch is adjusted based on a frequency of the torque.

13. The method of claim 8, further comprising adjusting the torque capacity of the disconnect clutch in response to the torque.

14. The method of claim 13, where the torque capacity of the disconnect clutch is reduced in response to reducing torque capacity of the torque converter clutch being insufficient to reduce a sum of the torque and the engine combustion torque to a threshold torque.

15. A method, comprising:
adjusting a torque capacity of a first clutch located upstream of a transmission input shaft in response to a torque determined via inertia of one or more devices located upstream of the first clutch, the inertia including inertia of a disconnect clutch and inertia of a motor, the disconnect clutch directly coupled to the motor; and
adjusting a torque capacity of a second clutch located upstream of the transmission input shaft in response to an operating condition of the first clutch or a sum of the torque and engine combustion torque exceeding a threshold torque at the transmission input shaft.

16. The method of claim 15, where the operating condition of the first clutch is a temperature of the first clutch exceeding a threshold temperature.

17. The method of claim 16, further comprising increasing coolant flow to the first clutch in response to the first clutch exceeding the threshold temperature.

18. The method of claim 15, where the inertia located upstream of the first clutch does not include inertia of a dampening flywheel.

19. The method of claim 15, further comprising adjusting the torque capacity of the first clutch in response to the engine combustion torque during a transmission gear shift.

20. The method of claim 15, further comprising adjusting the torque capacity of the first or second clutch in response to speed of the motor exceeding a threshold speed.

\* \* \* \* \*